(12) United States Patent
Sato

(10) Patent No.: US 7,880,905 B2
(45) Date of Patent: Feb. 1, 2011

(54) IMAGE PROCESSING APPARATUS, METHOD AND PROGRAM

(75) Inventor: Tomoya Sato, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1087 days.

(21) Appl. No.: 11/548,869

(22) Filed: Oct. 12, 2006

(65) Prior Publication Data

US 2007/0091381 A1 Apr. 26, 2007

(30) Foreign Application Priority Data

Oct. 24, 2005 (JP) ............................. 2005-309003

(51) Int. Cl.
*G06F 3/12* (2006.01)
*G06F 15/00* (2006.01)
*G06K 1/00* (2006.01)

(52) U.S. Cl. ...................... 358/1.13; 358/1.15; 358/1.1; 358/3.28

(58) Field of Classification Search ......... 358/1.1–1.18, 358/3.28; 382/100
See application file for complete search history.

(56) References Cited

U.S. PATENT DOCUMENTS

| | | | | |
|---|---|---|---|---|
| 6,697,847 | B2 * | 2/2004 | Iwata | 709/218 |
| 7,532,366 | B1 * | 5/2009 | Yang et al. | 358/3.28 |
| 7,639,836 | B2 * | 12/2009 | Ito | 382/100 |
| 2002/0191216 | A1 * | 12/2002 | Umeda et al. | 358/1.15 |
| 2005/0280837 | A1 * | 12/2005 | Ono et al. | 358/1.1 |
| 2007/0030521 | A1 * | 2/2007 | Fujii et al. | 358/3.28 |

FOREIGN PATENT DOCUMENTS

| | | |
|---|---|---|
| JP | 4-172757 A | 6/1992 |
| JP | 2004-139158 | 5/2004 |
| JP | 2004-153567 A | 5/2004 |

\* cited by examiner

*Primary Examiner*—James A Thompson
*Assistant Examiner*—Satwant K Singh
(74) *Attorney, Agent, or Firm*—Rossi, Kimms & McDowell LLP

(57) ABSTRACT

An image processing apparatus (110), which is equipped with multiple image processing functions, processes an input image using an image processing function set at the time of image input. An image processing apparatus (100) registers setup information relating to processes of respective ones of the multiple image processing functions to be applied to an image of interest, encodes the setup information and generates an identification indicator. The image of interest and the identification indicator are formed on the same print medium and output. The image processing apparatus (110) reads the print medium, extracts the image of interest and the identification indicator, analyzes the identification indicator to thereby acquire the setup information, and uses the setup information to process the image of interest by the image processing function set in the image processing apparatus (110) when the print medium was read.

12 Claims, 14 Drawing Sheets

IMAGE PROCESSING APPARATUS, METHOD AND PROGRAM

BACKGROUND OF THE INVENTION

1. Field of the Invention

The present invention relates to an apparatus, method and program for reading a document to which printing conditions, etc., have been added in the form of machine-readable identification information such as a barcode, and executing print processing based upon conditions that have been set for the image read.

2. Description of the Related Art

Many systems known in the art for printing out images form the printing conditions of the image on part of the print surface as a barcode, analyze the printing conditions, which have been embedded in the barcode, etc., when the document is read, and use these printing conditions in various processing. By way of example, an image printing system has been proposed in which information for an output such as a double-sided printing output or sorted output is appended to a document as a barcode and an output that complies with the embedded settings is delivered when the document is read and output. An advantage of this system is that output settings are easy to make.

In another proposed system (e.g., see the specification of Japanese Patent Application Laid-Open No. 2004-139158), the storage location of a document file, such as URL, and printing conditions are embedded in a two-dimensional barcode, and printing is performed upon acquiring the print data using the extracted URL.

Meanwhile, multifunction peripherals have become widespread in recent years. A multifunction peripheral is capable of processing, by a single apparatus, not only a print function for printing an image on a print medium such as paper but also multiple functions such as transmitting and storing functions. With such a multifunction peripheral, different settings to be implemented through a plurality of functions may be desired to be registered for an image obtained by reading a certain document. For example, it may be desired to register settings for copying and settings for transmission for the same image.

However, with a conventional multifunction peripheral, in order to implement multiple processing functions with regard to a document that has been read in, it is necessary to individually select settings that are appropriate for each of the individual functions when the document has been read in. For example, when a user who is attempting to transmit a document reads in the document, the user is required to make transmission setting for the document. When a user who is attempted to perform copying reads in the document, the user is required to make copy setting for the document.

SUMMARY OF THE INVENTION

The present invention makes it possible to solve the foregoing problem.

According to an embodiment of the present invention, the problem is solved by providing an image processing apparatus, which has multiple image processing functions, for processing an entered image using an image processing function that has been set at the time of image input, comprising: a designating unit adapted to designate a processing mode for using any of the plurality of image processing functions to be applied to an image of interest; an extracting unit adapted to extract an identification indicator, which represents setup information to be used when a print medium on which the image of interest has been printed is read and the image of interest processed using the plurality of image processing functions; an analyzing unit adapted to analyze the identification indicator and acquire the setup information; and a processing unit adapted to process the image of interest using setup information, among the setup information analyzed by the analyzing unit, to be used by an image processing function regarding a processing mode that has been designated by the designating unit when the print medium is read.

According to another embodiment of the present invention, the foregoing problem is solved by providing an image processing method in an image processing apparatus, which has multiple image processing functions, for processing an entered image using an image processing function that has been set at the time of image input, comprising the steps of: designating a processing mode for using any of the plurality of image processing functions to be applied to an image of interest; extracting an identification indicator, which represents setup information to be used when a print medium on which the image of interest has been printed is read and the image of interest processed using the plurality of image processing functions; analyzing the identification indicator and acquiring the setup information; and processing the image of interest using setup information, among the setup information analyzed at the analyzing step, to be used by an image processing function regarding a processing mode that has been designated at the designating step when the print medium is read.

According to another embodiment of the present invention, the foregoing problem is solved by providing a program which causes an image processing apparatus to execute the following steps, wherein the image processing apparatus, which has multiple image processing functions, processes an entered image using an image processing function that has been set at the time of image input: designating a processing mode for using any of the plurality of image processing functions to be applied to an image of interest; extracting an identification indicator, which represents setup information to be used when a print medium on which the image of interest has been printed is read and the image of interest processed using the plurality of image processing functions; analyzing the identification indicator and acquiring the setup information; and processing the image of interest using setup information, among the setup information analyzed at the analyzing step, to be used by an image processing function regarding a processing mode that has been designated at the designating step when the print medium is read.

Further features of the present invention will become apparent from the following description of exemplary embodiments (with reference to the attached drawings).

DESCRIPTION OF THE EMBODIMENT

A preferred embodiment of the present invention will now be described in detail with reference to the accompanying drawings. It should be noted that the relative arrangement of the components, the numerical expressions and numerical values set forth in this embodiment do not limit the scope of the present invention unless it is specifically stated otherwise.

The configuration and operation of an image processing system according to an embodiment of the present invention will now be described in detail with reference to the accompanying drawings.

<Structure and Operation of Image Processing System>

Figure 1:
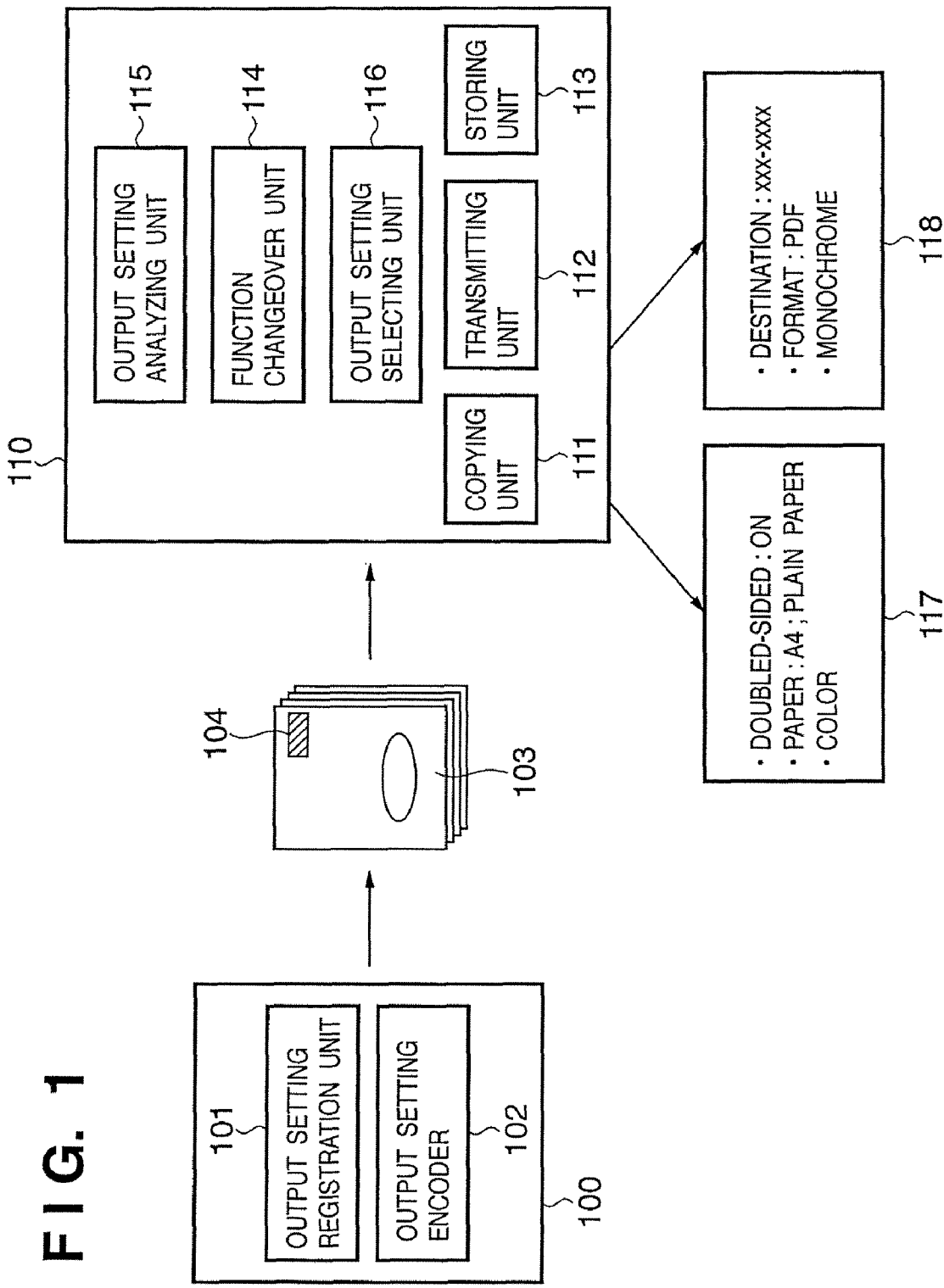
FIG. 1 is a diagram illustrating the overall configuration of an image processing system according to an embodiment of the present invention.

FIG. 1 is a diagram illustrating the overall configuration of an image processing system according to an embodiment of the present invention. As shown in FIG. 1, an image processing apparatus (copier) 100 has an output setting registration unit 101 and an output setting encoder 102. If a document copying operation is performed by operating the setting registration unit 101 when a paper document is to be copied using the image processing apparatus 100, the image processing apparatus 100 generates and outputs an image corresponding to the document read in. It should be noted that when a generated image is output, the image processing apparatus 100 embeds information relating to the content of the registered settings (namely the setup information) in a barcode 104, adds the barcode 104 to the image 103 and outputs the image. In this embodiment, setup information relating to multiple types of processing for a single document can be registered in the information relating to the setting content, examples of settings being settings for copying of the image, settings for transmission of the image and settings for storage of the image, etc.

Further, an image processing apparatus (multifunction peripheral) 110 has functions for copying, transmitting and storing images. These functions are implemented by a copying unit 111, a transmitting unit 112 and a storing unit 113, respectively, which are incorporated within the image processing apparatus 110. A function changeover unit 114 executes processing for changing over the functions in response to pressing of function changeover button displayed in the control panel of the image processing apparatus 110.

The image processing apparatus 110 further includes a setting analyzing unit 115 and a setting selecting unit 116. When the image 103 with the code image that has been output from the image processing apparatus 100 is read by an image reader in the image processing apparatus 110, the setup information that has been embedded in the barcode 104 registered by the image processing apparatus 100 is read and the information is then analyzed by the setting analyzing unit 115. It should be noted that the barcode analyzing processing executed by the setting analyzing unit 115 is well known and need not be described here. When the setting analyzing unit 115 analyzes the setup information that has been registered, the content of the analyzed settings is selected by the setting selecting unit 116.

The setting selecting unit 116 first discriminates the function currently selected at the image processing apparatus 110. If settings for the function currently selected have been embedded in the document that has been read in, then these settings are set in the image processing apparatus 110 and is displayed on the control panel. For example, if the copy function has been set, then settings for copying of the kind indicated at 117 are displayed on the control panel. If the transmit function has been set, then settings for transmission of the kind indicated at 118 is displayed on the control panel. In the event that settings for the currently selected function have not been registered, then this fact is displayed on the control panel to so notify the user.

In this embodiment, the image processing apparatus 100 and image processing apparatus 110 are described as being different from each other, as illustrated in FIG. 1. However, it may be so arranged that the present image processing system is implemented by two identical image processing apparatuses or by a single image processing apparatus. Further, although setup information relating to a plurality of processing functions is embedded in a barcode, it may be so arranged that the setup information is generated as an indicator other than a barcode and formed on the print medium. The details of the structure of an image processing apparatus equipped with the functions of a multifunction peripheral will be described as a representative example of the detailed structure of the image processing apparatuses 100, 110.

Figure 2:
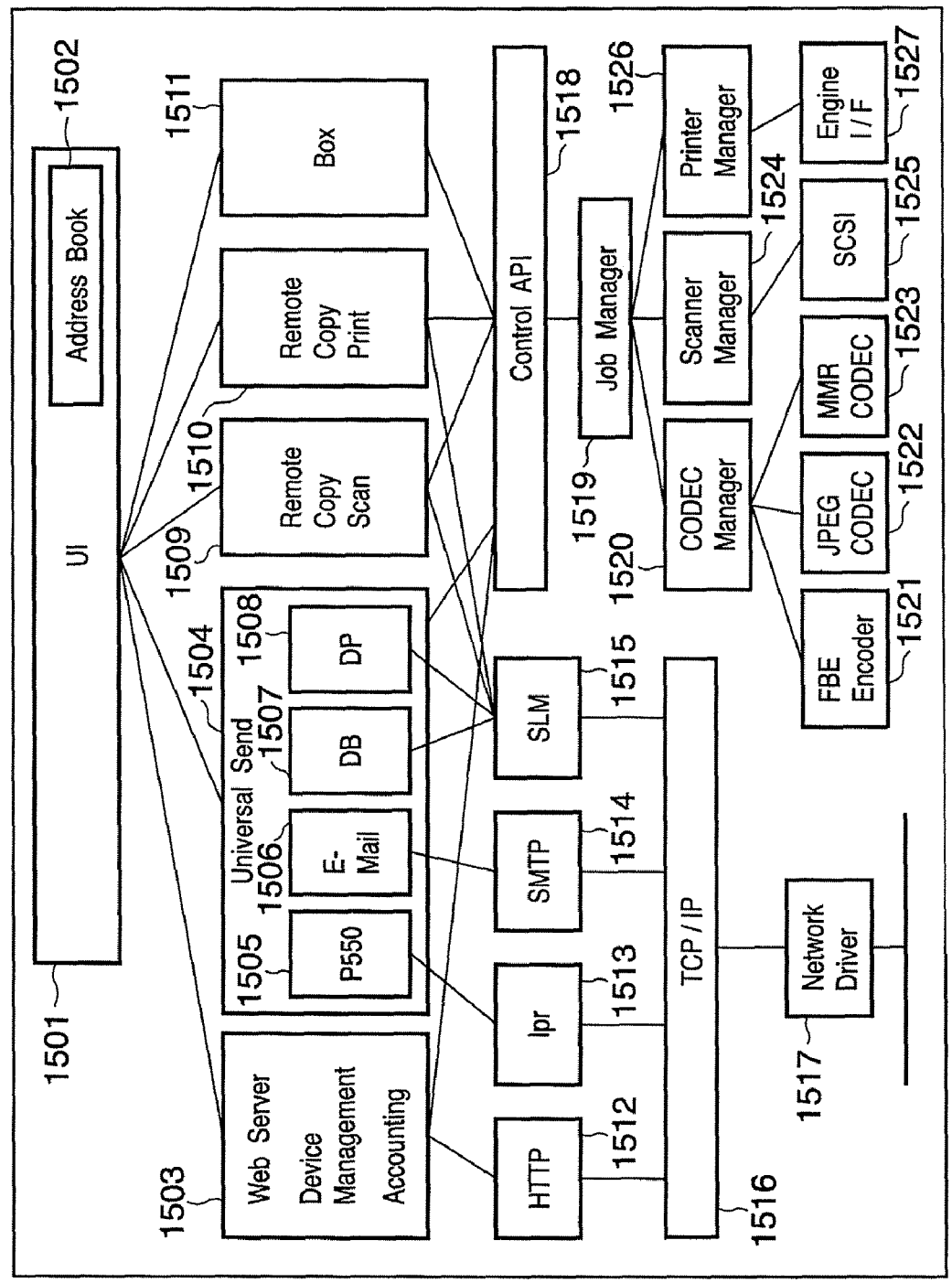
FIG. 2 is a block diagram illustrating the software implementation of the image processing apparatus according to the embodiment.

FIG. 2 is a block diagram illustrating the software implementation of the image processing apparatus according to the embodiment. A user interface 1501 (UI) 1501 in FIG. 2 is a module that allows the operator to interface the apparatus when various operations and settings are performed using the image processing apparatus. In accordance with the operation performed by the operator, this module transfers input information to various modules (described below) and requests processing or sets data, etc.

An address book 1502 is a database module that manages the destinations to which data is sent and communicated. Data is added to, deleted from and acquired from the content of the address book 1502 in response to an operation performed at the user interface 1501. The address book 1502 is used as a unit adopted to apply data transmission and communication destination information to each of the modules in response to an operation by the operator.

A web server module 1503 is used to give notification of information for managing the image processing apparatus in response to a request from a web client (not shown). The management information is read via a universal send module 1504, a remote copy print module 1510, a remote copy scan module 1509 and a control API module 1518, all of which will be described later. Notification is given to the web server via an HTTP module 1512, TCP/IP module 1516 and network driver module 1517.

The universal send module 1504 administers the distribution of data. This modules distributes data, which has been specified by the operator using the user interface 1501, to a communication (output) destination similarly specified. Further, in a case where the scanner function of the apparatus is used and generation of distribution data has been specified by the operator, the universal send module 1504 causes the apparatus to operate via the control API module 1518 so as to generate the data.

A module 1505 is activated within the universal send module 1504 when a printer has been designated as the output destination. A module 1506 is activated within the universal send module 1504 when an e-mail address has been designated as the communication destination. A module 1507 is activated within the universal send module 1504 when a database has been designated as the output destination. A module 1508 is activated within the universal send module 1504 when an image processing apparatus similar to this apparatus has been designated as the output destination. The remote copy scan module 1509 uses the scanner function of this image processing apparatus, causes another image processing apparatus connected via a network or the like to serve as the output destination and executes processing equivalent to a copy function implemented by this image processing apparatus alone.

The remote copy print module 1510 uses the printer function of this image processing apparatus, causes another image processing apparatus connected via a network or the like to serve as the input destination and executes processing equivalent to a copy function implemented by this image processing apparatus alone. A box module (box) 1511 stores a scanned image or PDL print image on hard-disk drive. This module provides management functions such as printing of a stored image using the printer function, transmission of a stored image using the universal send function, deletion of a document stored on the hard-disk drive, grouping (storage of data in separate boxes), movement of data between boxes and copying between boxes.

The HTTP module 1512 is used when this image processing apparatus communicates by HTTP, and it provides communication to the web server module 1503 by the TCP/IP module 1516, described later. An lpr module 1513 provides communication to the printer module 1505 within the universal send module 1504 by the TCP/IP module 1516. An SMTP module 1514 provides communication to the e-mail module 1506 within the universal send module 1504 by the TCP/IP module 1516.

A salutation manager (SLM) module 1515 provides communication to the database module 1507 within the universal send module 1504 by the TCP/IP module 1516. Similarly, the SLM module 1515 provides network communication to the DP module 1508, remote copy scan module 1509 and remote copy print module 1510. The TCP/IP module 1516 provides network communication to each of the above-mentioned modules by the network driver module 1517. The latter controls the components physically connected to the network.

The control API module 1518 provides the upstream modules such as the universal send module 1504 with an interface to the downstream modules such as a job manager module 1519. The control API module 1518 mitigates the dependence relationship between the upstream and downstream modules and enhances the universality of these modulates. The job manager module 1519 interprets processing specified by the various modules via the control API module 1518 and instructs modules described later. This module centrally manages hardware-related processes executed within the image processing apparatus.

A CODEC manager 1520 manages and controls various types of compression and expansion of data during processing specified by the job manager module 1519. Using the FBE format, an FBE encoder 1521 compresses data that has been read in by scan processing executed by the job manager module 1519 and a scan manager module 1524. A JPEG coder 1522 executes the following processing in scan processing executed by the job manager module 1519 and scan manager module 1524 and print processing executed by a print manager module 1526: JPEG compression of data that has been read in and JPEG expansion of print data.

An MMR codec 1523 executes the following processing in scan processing executed by the job manager module 1519 and scan manager module 1524 and print processing executed by the print manager module 1526: MMR compression of read data and MMR expansion of print data. The scan manager module 1524 manages and controls scan processing specified by the job manager module 1519. An SCSI driver 1525 performs communication between the scan manager module 1524 and the scanner connected internally of the image processing apparatus. The print manager module 1526 manages and controls print processing specified by the job manager module 1519. An engine interface driver 1527 provides an interface between the print manager module 1526 and printer.

Figure 3:
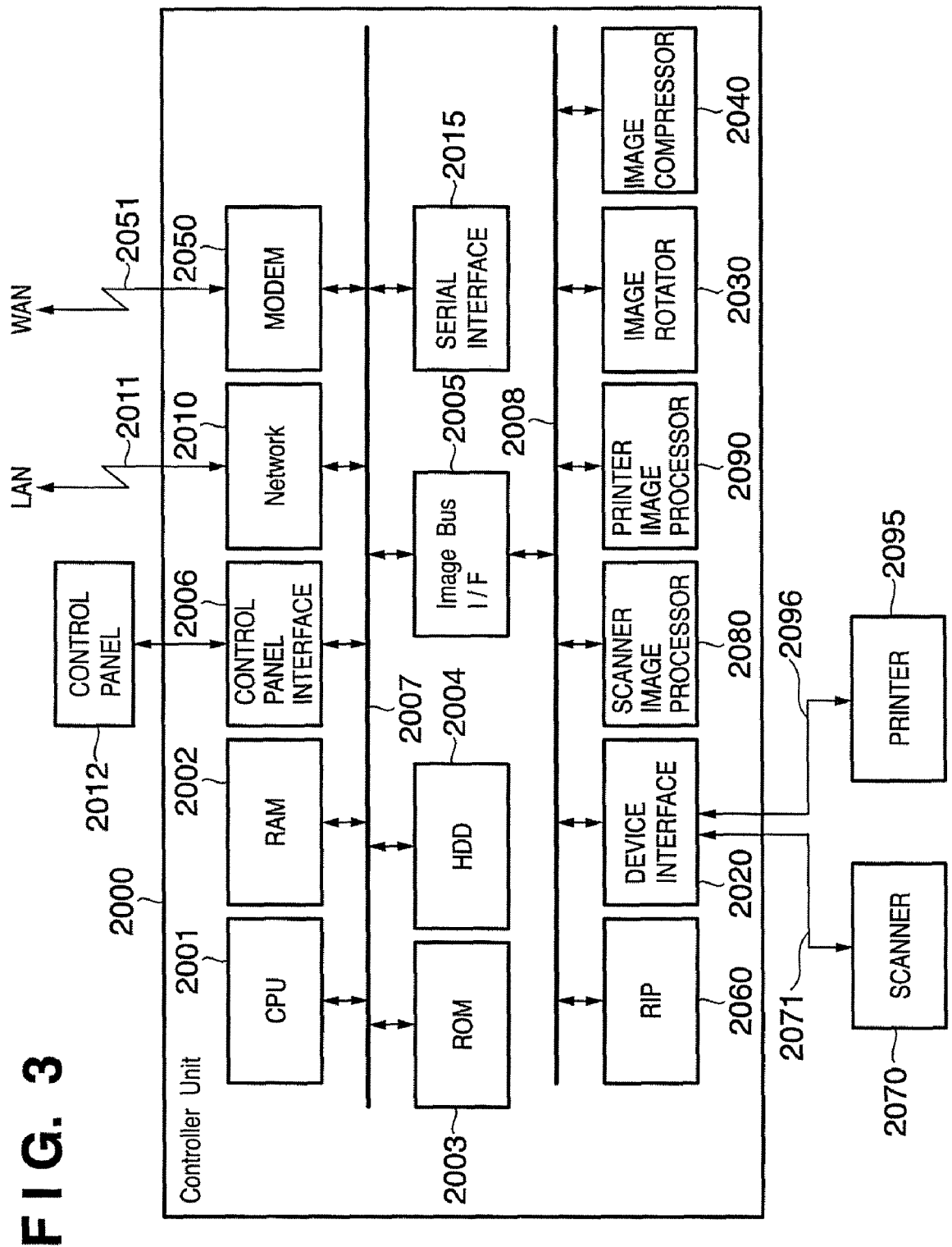
FIG. 3 is a block diagram illustrating the detailed structure of the image processing apparatus according to the embodiment.

FIG. 3 is a block diagram illustrating the detailed structure of the image processing apparatus according to this embodiment. A controller unit 2000 is for inputting and outputting image information and device information. The controller unit 2000 is connected to a scanner 2070 serving as an image input device and to a printer 2095 serving as an image output device. On the other hand, it is also connected to a LAN 2011 or public line (WAN) 2051. A CPU 2001 is a controller for controlling the overall system.

A RAM 2002 is a system work memory operated by the CPU 2001. This is also an image memory for temporarily storing image data. The booting program of the apparatus has been stored in a booting ROM 2003. A hard-disk drive (HDD) 2004 stores the system software and image data on a hard disk. A control-panel interface (I/F) 2006, which is for interfacing a control panel (UI) 2012, outputs image data to be displayed on the control panel 2012 to the control panel 2012. The control panel interface 2006 also communicates to the CPU 2001 information that the system user has entered from the control panel 2012. A network 2010 is connected to the LAN 2011 and inputs and outputs information. A modem 2050 is connected to the public line 2051 and inputs and outputs information.

The system described above is disposed on a system bus 2007.

An image bus interface 2005 is a bus bridge that connects the system bus 2007 and an image bus 2008, which transfers image data at a high speed, and converts data structure. The image bus 2008 is constituted by a PCI bus or IEEE 1394. The devices set forth below are disposed on the image bus 2008.

A raster image processor (RIP) 2060 expands PDL (Page Description Language) code into a bitmap image. A device interface (I/F) 2020 connects the scanner 2070 and printer 2095, which are image input/output devices, to the controller 2000 and subjects image data to a synchronous/asynchronous conversion. A scanner image processor 2080 subjects input image data to correction, manipulation and editing. A printer image processor 2090 subjects printout image data to correction and resolution conversion processing, etc. An image rotator 2030 rotates the image data. An image compressor 2040 subjects multivalued image data to JPEG compression/expansion processing and subjects binary image data to JBIG, MMR or MH compression/expansion processing.

Figure 4:
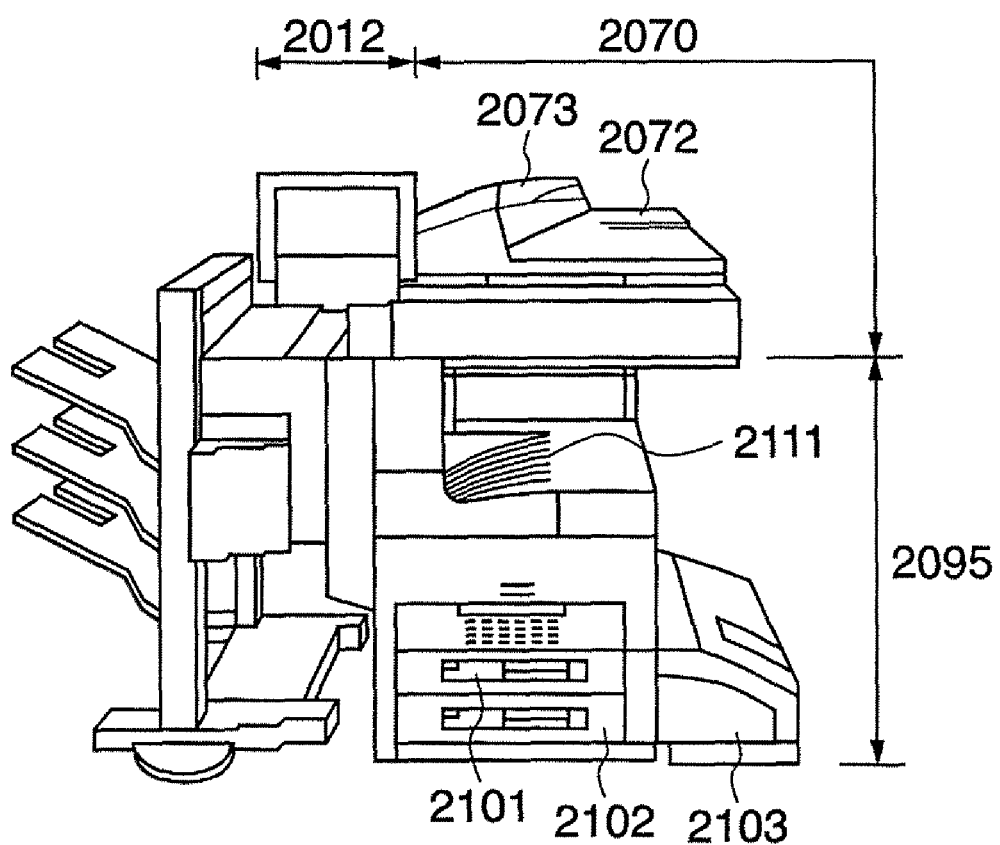
FIG. 4 is an external view of the image processing apparatus according to the embodiment.

FIG. 4 is an external view of the image processing apparatus according to this embodiment of the present invention. The scanner 2070, which is an image input device, illuminates the image on a paper document and scans the document using a CCD line sensor to convert the scanned image to an electric signal as raster-image data 2071. The document is placed on a tray 2073 of an document feeder 2072 by the user of the apparatus, after which the start of reading is commanded by the control panel 2012. In response, the CPU 2001 of control unit 2000 applies a command to the scanner 2070 and the document feeder 2072 feeds in the document one sheet at a time so that the document images are read.

The printer 2095 serving as an image output device converts raster image data 2096 to an image on paper. Any conversion scheme may be used. Examples are electrophotography, which employs a photosensitive drum or belt, and an ink-jet technique, which prints an image directly on paper by jetting ink from an array of very small nozzles. The printing operation is started up in response to a command from the CPU 2001. The printer 2095 possesses a plurality of supply bins that make it possible to select printing paper of different sizes and orientations, as well as cassettes 2101, 2102 and 2103 corresponding to these bins. A drop tray 2111 receives the printing paper on which printing has been completed.

Figure 5:
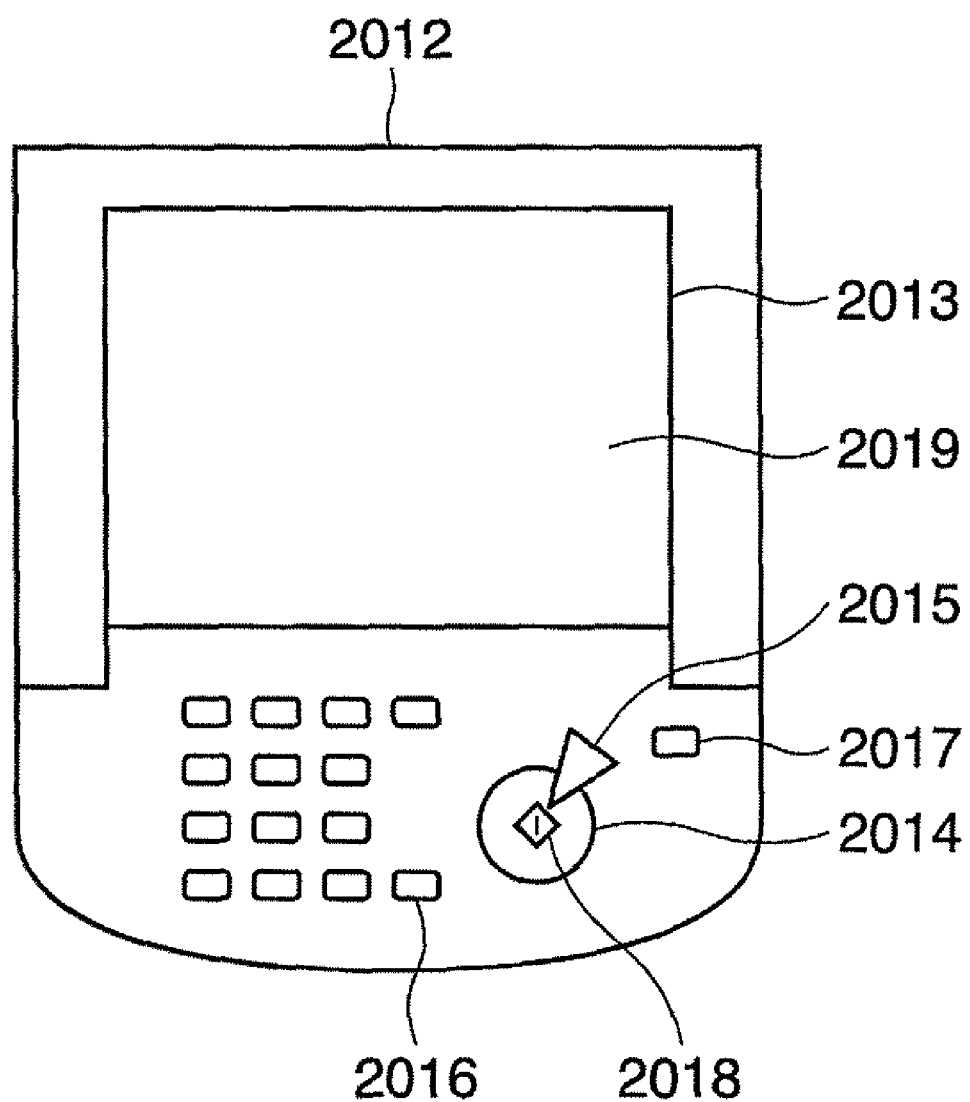
FIG. 5 is a diagram illustrating the external arrangement of a control panel in the image processing apparatus according to the embodiment.

FIG. 5 is a diagram illustrating the external arrangement of the control panel 2012. As shown in FIG. 5, an LCD display unit 2013 of the control panel 2012 includes a touch-sensitive panel sheet 2019 affixed to an LCD and displays a screen for operating the apparatus as well as soft keys. If a displayed key is pressed, information indicating the position of this key is sent to the CPU 2001. A start key 2014 is pressed if reading of the document image is to be started. Situated at the center of the start key 2014 is a two-color (green and red) LED 2018 the color of which when lit indicates whether the start key 2014 is operable or not. A stop key 2015 is for halting an operation that is currently in progress. An ID key 2016 is used by being pressed when the user inputs a user ID. A reset key 2017 is used to initialize settings from the control panel 2012.

Figure 6:
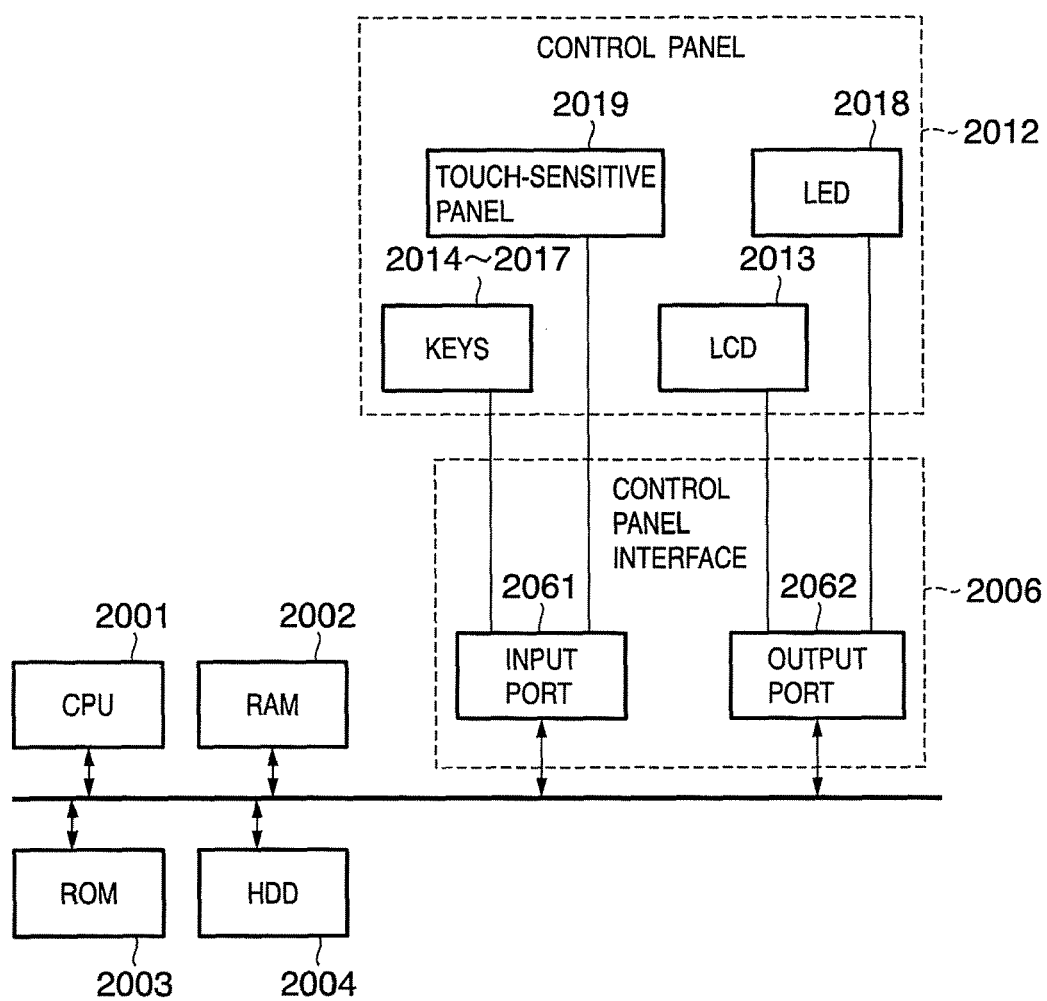
FIG. 6 is a block diagram illustrating the detailed structure of the control panel in the image processing apparatus according to the embodiment.

FIG. 6 is a block diagram illustrating the detailed structure of the control panel 2012 in the image processing apparatus according to this embodiment. The CPU 2001 in the image processing apparatus is a CPU for control and exercises overall control of access to various devices, which are connected to the system bus 2007, based upon a control program, etc., stored in the program ROM 2003 and hard-disk drive 2004. Further, the CPU 2001 reads in input information from the scanner 2070 connected via an image input interface 2071 and outputs an image signal, which serves as output information, to the printer 2095 connected via a printer interface 2096.

Main memory 2002 of CPU 2001 is a RAM that functions as a work area, etc. The memory 2002 receives a user input from the touch-sensitive panel 2019 or hard keys 2014 to 2017 and acquires the content of operation via an operation input interface 2061. Display screen data is generated in the CPU 2001 based upon the acquired content of operation and control program. The display screen is output to a screen output device 2013 such as an LCD or CRT via an output device controller 2062.

[Description of Output-Setting Registration]

Reference will be had to FIGS. 7 to 12 to describe operation when the image processing apparatus 100 registers the settings of each of the functions and copies a document.

Figure 7:
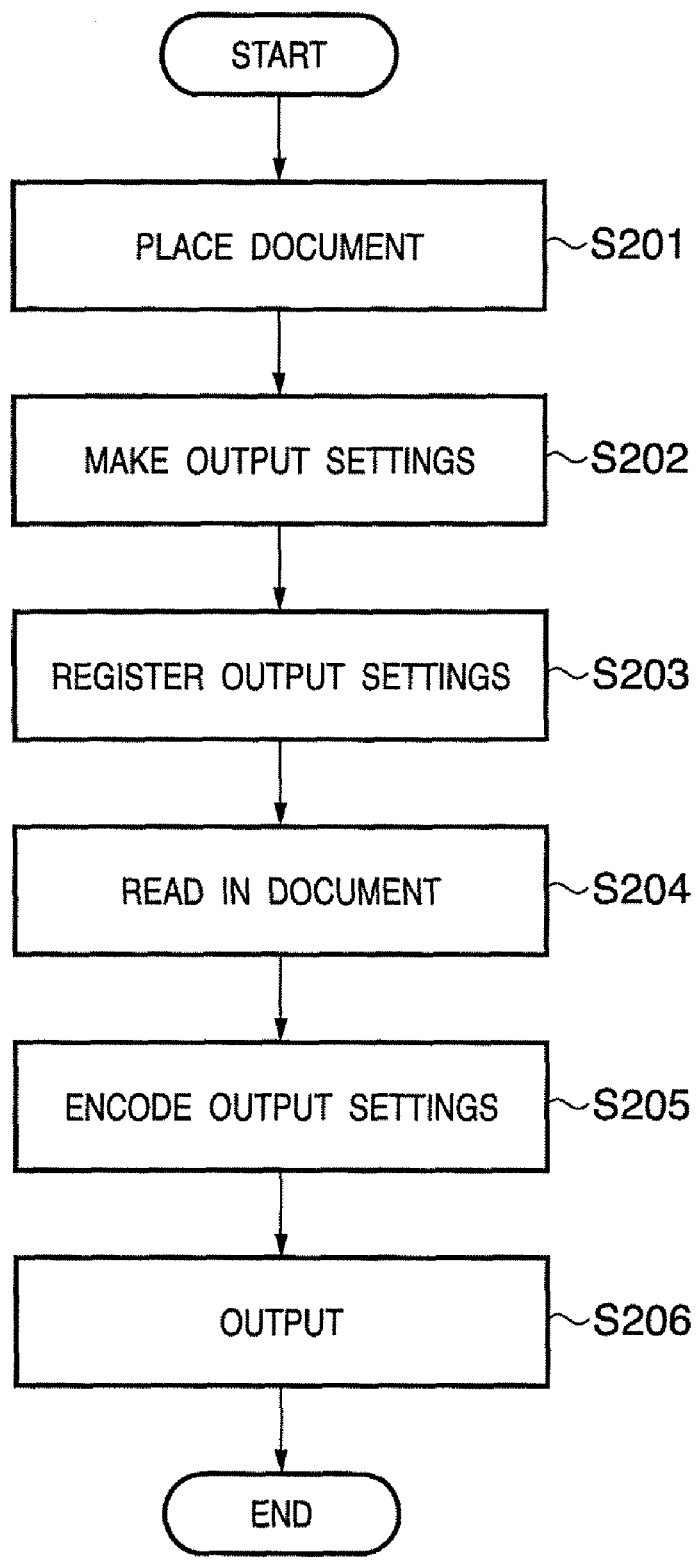
FIG. 7 is a flowchart useful in describing processing for registering image output settings executed by the image processing apparatus according to the embodiment.
Figure 8:
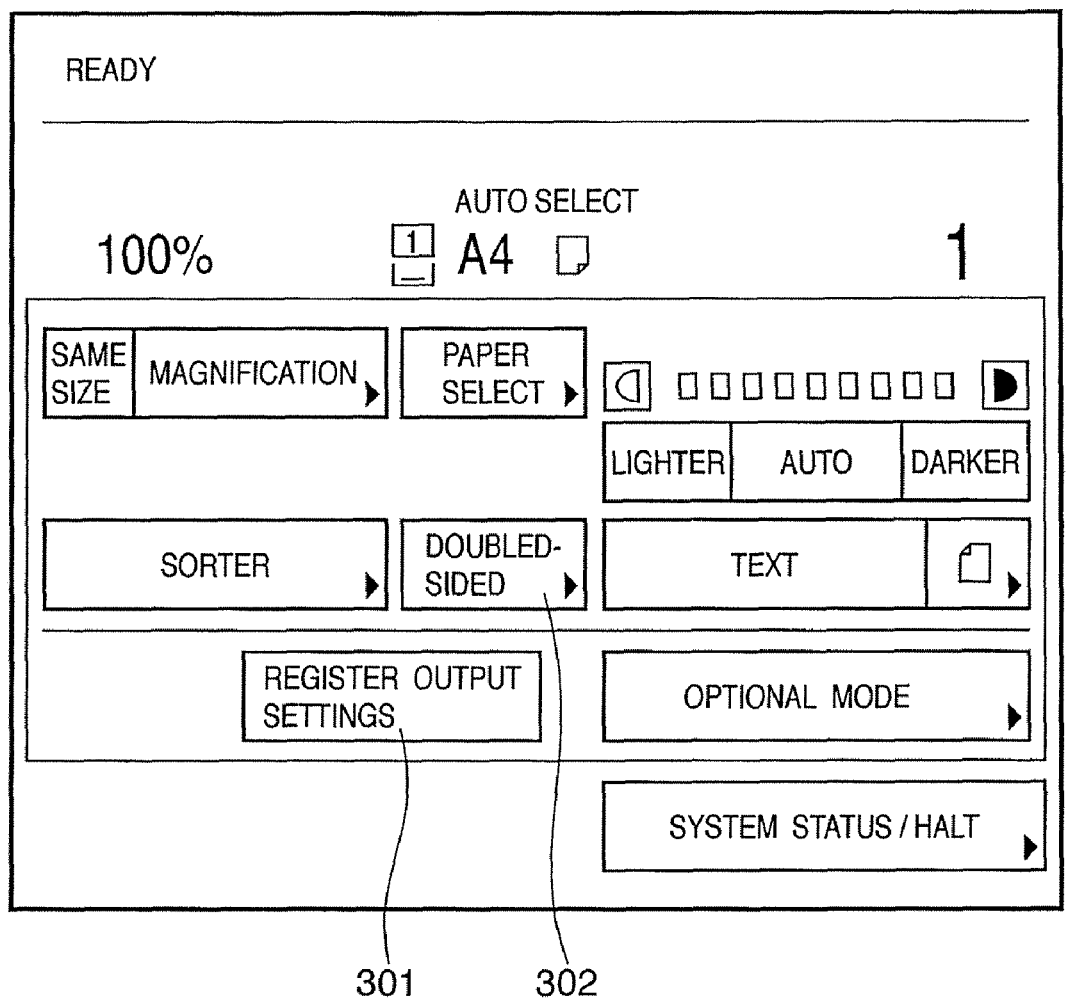
FIG. 8 is a diagram illustrating an example of a basic screen displayed on the control panel when output settings are made in the image processing apparatus.

FIG. 7 is a flowchart useful in describing processing for registering image output settings executed by the image processing apparatus according to this embodiment. First, the user places a document to be copied in the scanner 2002 (step S201). Next, the user makes output settings for the image that is to be output (step S202). FIG. 8 is a diagram illustrating an example of a basic screen displayed on the control panel 2012 when output settings are made in the image processing apparatus 100. By manipulating the screen shown in FIG. 8, the user specifies the number of copies, whether or not a double-sided output is to be performed, finishing, etc.

Figure 9:
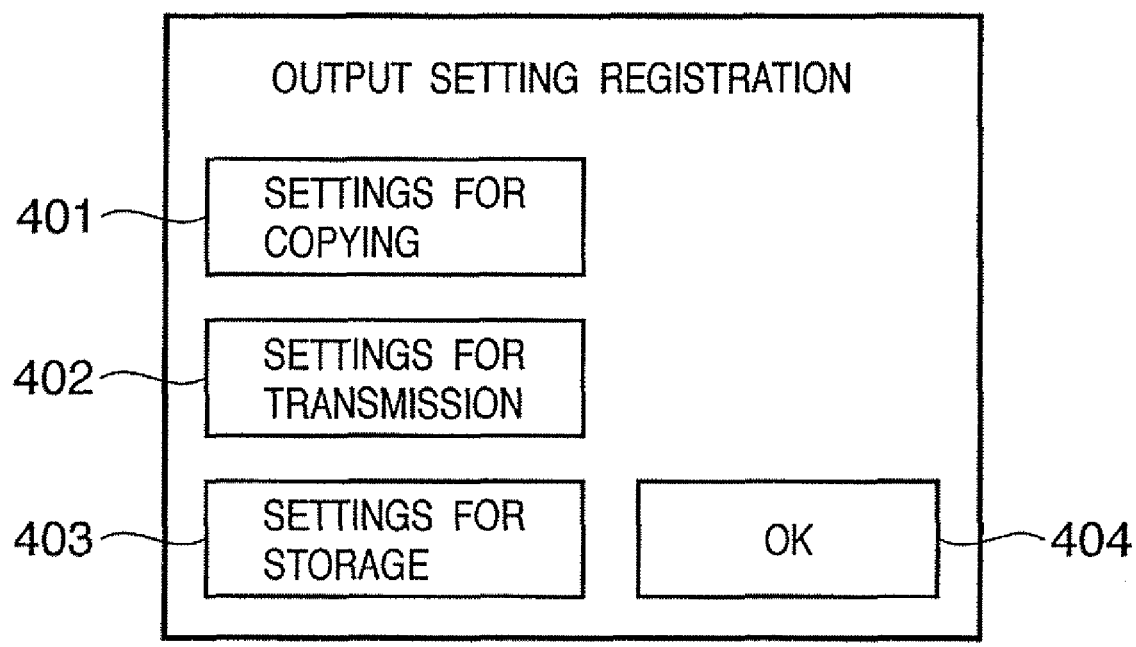
FIG. 9 is a diagram illustrating an example of a setting registration screen displayed when a user presses a button on the screen shown in FIG. 8.

Next, the settings are registered (step S203). The data set and registered is put into the form of a barcode and is output by encoding processing, described later. FIG. 9 is a diagram illustrating an example of a setting registration screen displayed when a user presses a button 301 on the screen shown in FIG. 8. Using the screen shown in FIG. 9, the user selects which of the following settings is to be registered: settings for copying, settings for a transmission and settings for storage. A button 401 is pressed to register the settings for copying, a button 402 to register the settings for a transmission, and a button 403 to register the settings for storage.

Figure 10:
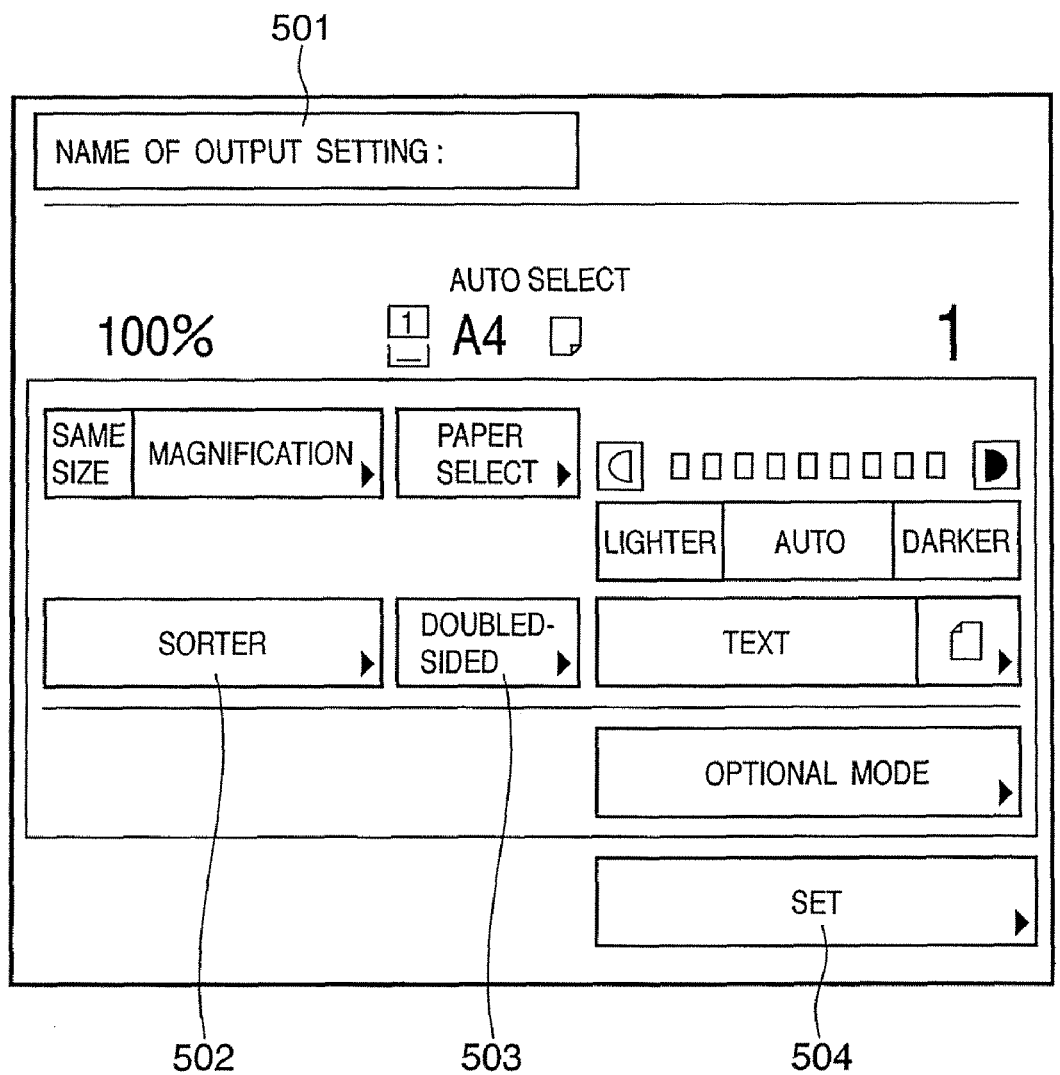
FIG. 10 is a diagram illustrating a screen displayed when a copy setting button is pressed on the screen shown in FIG. 9.

FIG. 10 is a diagram illustrating a screen displayed when the copy setting button 401 is pressed on the screen shown in FIG. 9. If an output-setting name button 501 is pressed, a screen for inputting the name of output settings is displayed. A name for identifying these settings can be appended. Since the entered name is encoded together with the output setup information, identification of registered settings is facilitated. The output setting registration is performed by an operation equivalent to that for usual output settings.

By employing the screen shown in FIG. 10, output settings are made using a sorter button 502 and a doubled-sided print button 503, etc., and a set button 504 is pressed after the settings of each of the items are completed. As a result, each setting selected on the screen shown in FIG. 10 is registered. The operation involved in registering settings basically is the same as the operation for making output settings at step S202. However, in the output settings at step S202, control is exercised in such a manner that only output settings that are possible in the image processing apparatus are made.

For example, in a case where the image processing apparatus 100 does not possess a double-sided printing function, control is such that the double-sided print button 302 on the screen shown in FIG. 8 is not displayed and cannot, therefore, be selected. On the other hand, in the output setting registration at step S203, the double-sided print button is displayed and the doubled-sided print setting is capable of being made even in a case where the image processing apparatus 100 does not have the double-sided print function. The reason for this is that it is conceivable that the image processing apparatus 110, which reads in and outputs a document on which a barcode has been formed, will have the double-sided print function, in which case there will be a request to the effect that registration of the double-sided output setting is desired.

Figure 11:
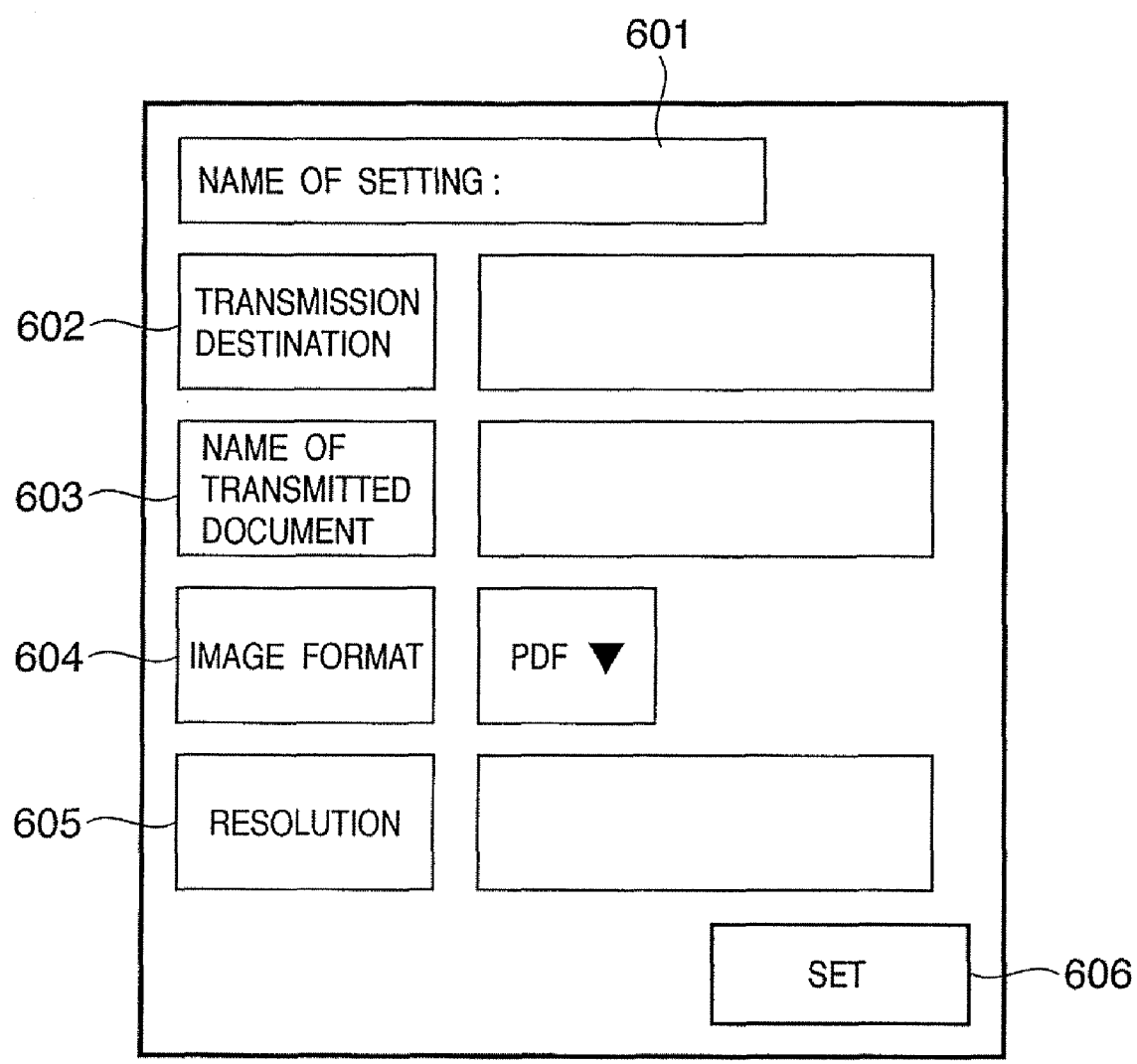
FIG. 11 is a diagram illustrating a screen displayed when a transmit setting button is pressed on the screen shown in FIG. 9.

The button 402 on the screen of FIG. 9 is pressed in order to make settings for a transmission. FIG. 11 is a diagram illustrating a screen displayed when the transmit setting button 402 is pressed on the screen shown in FIG. 9. If a setting name button 601 is pressed on the screen shown in FIG. 11, a screen for inputting the name of transmit settings is displayed. As a result, a name for identifying these settings can be appended. Registration of transmit settings can be implemented by an operation equivalent to that for usual transmit settings. A destination button 602, transmit-document name setting button 603, image-format selecting button 604 and resolution specifying button 605, etc., are used to make the transmit settings, and a set button 606 is pressed upon completion of the setting of each of the items.

Figure 12:
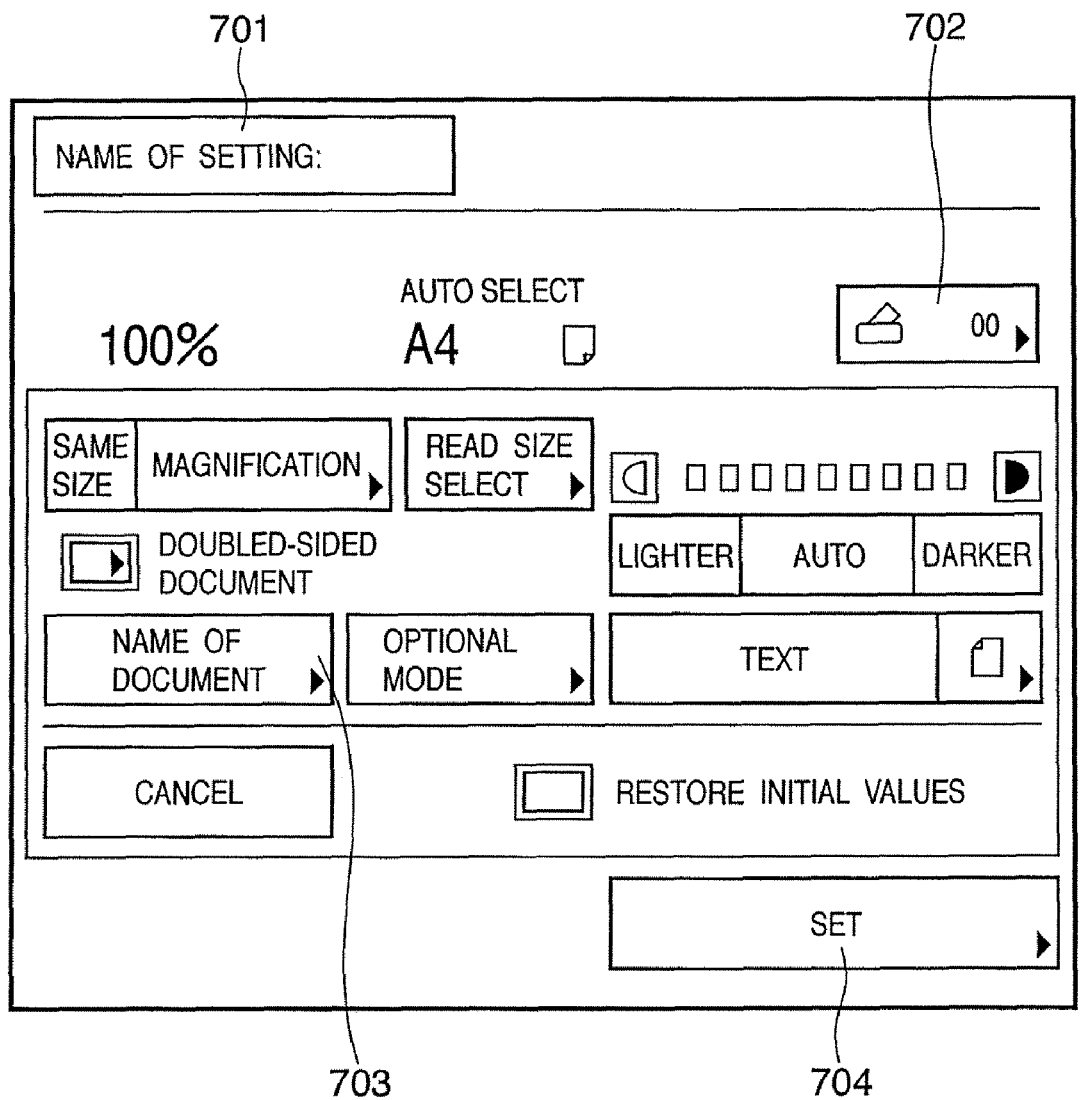
FIG. 12 is a diagram illustrating a screen displayed when a storage setting button is pressed on the screen shown in FIG. 9.

The button 403 is pressed in order to make the storage settings. FIG. 12 is a diagram illustrating a screen displayed when the storage setting button 403 is pressed on the screen shown in FIG. 9. Registration of storage settings can be implemented by an operation equivalent to that for usual storage settings. A setting name button 701, save-destination selecting button 702, saved-file name setting button 703, etc., are used to make the storage settings, and a set button 704 is pressed upon completion of the setting of each of the items.

If an OK button 404 is pressed in FIG. 9, the basic screen shown in FIG. 8 is restored. In a case where even one output setting has been registered on this screen, the button 301 is reverse highlighted to indicate to the user that the setting has been registered. If the user presses the start key, the document is read (step S204) and the registered settings are converted to a barcode image by a setting encoder (step S205). The image read by the reader and the image encoded by the encoder are output by the output unit (step S206). Although the setup information is converted to a barcode image in this embodiment, an identification indicator, such as a graphic, other than a barcode may be used.

[Description of Setting Selection]

Figure 13:
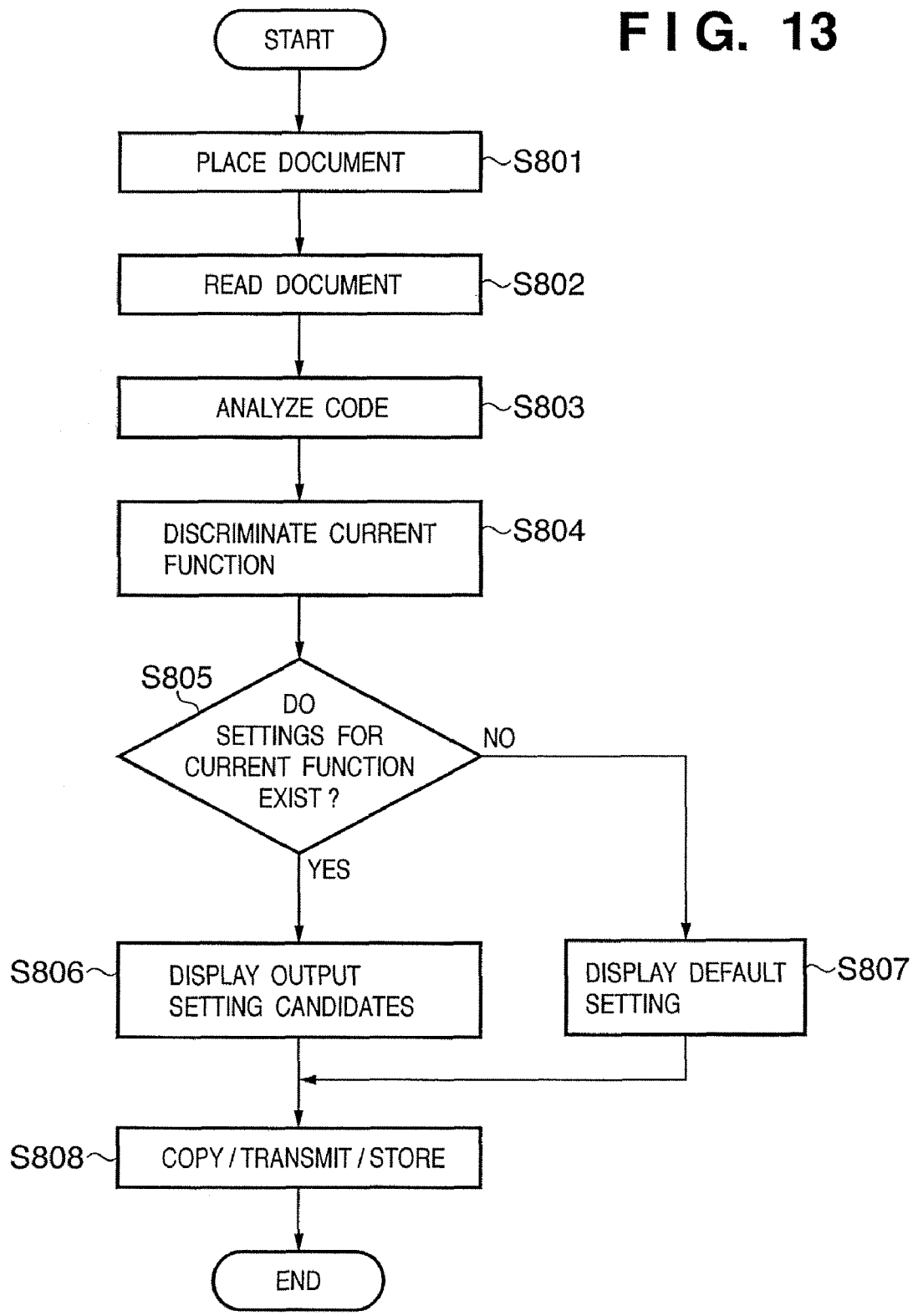
FIG. 13 is a flowchart useful in describing an image reading operation and a function setting operation by the image processing apparatus according to the embodiment.
Figure 14:
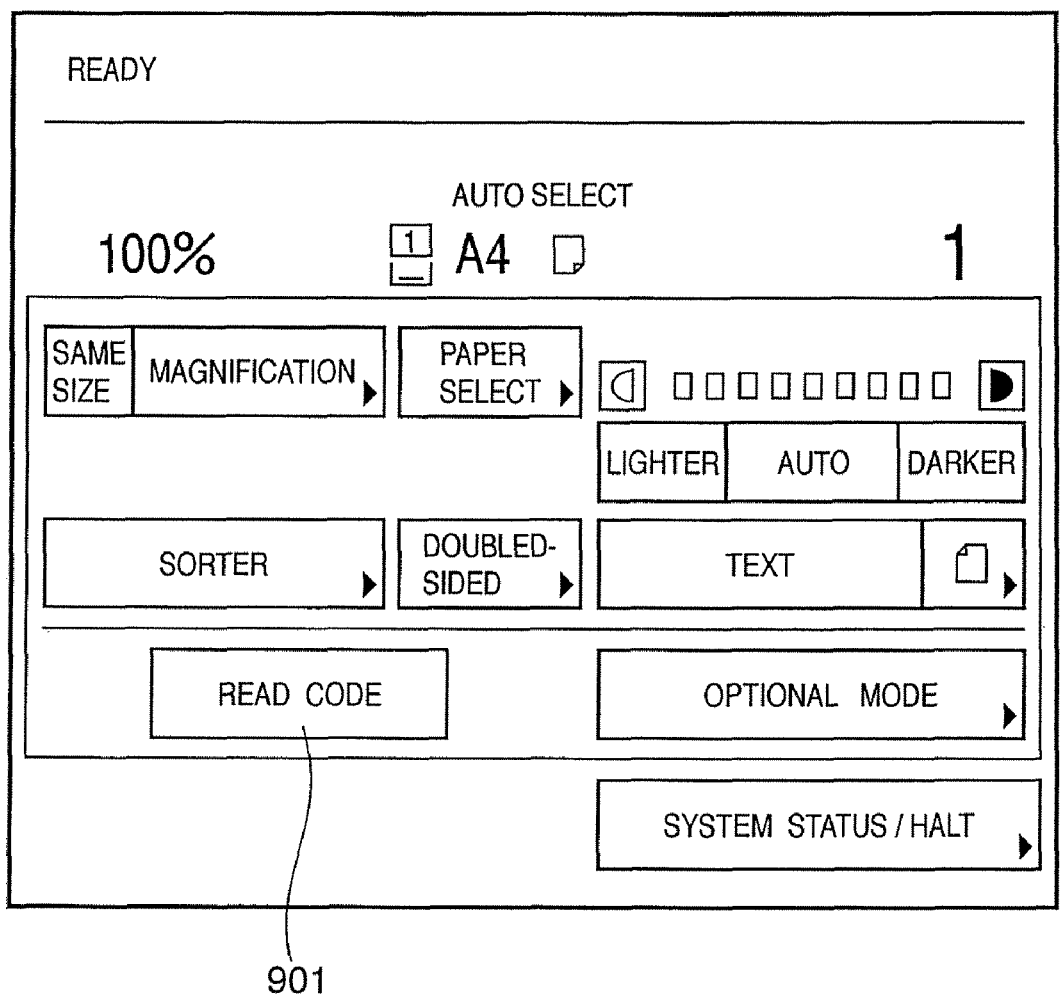
FIG. 14 is a diagram illustrating an example of a setting read-in screen at the time of a copy function, the screen being displayed on the control panel of the image processing apparatus.

Next, reference will be had to FIGS. 13 and 14 to describe the operation of the image processing apparatus 110. FIG. 13 is a flowchart useful in describing an image reading operation and a function setting operation by the image processing apparatus 110 according to this embodiment.

First, the user places a document with an appended barcode in the scanner (step S801). A button for starting reading of the barcode is displayed on the screen for setting the copy function, or on the screen for setting the transmit function, or the screen for setting storage. If the user presses this button, the image on the placed original is read (step S802). FIG. 14 is a diagram illustrating an example of a setting read-in screen at the time of a copy function, the screen being displayed on the control panel of the image processing apparatus 110. A button 901 on the screen shown in FIG. 14 is for starting the reading of the barcode.

The settings that have been embedded in the barcode in the read image are analyzed by pressing this button (step S803). The function currently selected at the image processing apparatus 110 is discriminated (step S804). As a result, it is determined whether the setup information with respect to the current function determined at step S804 is contained in the read barcode (step S805).

If the settings for the current function have been registered ("YES" at step S805), the output settings are displayed (step S806). For example, assume that this document has been read in from the screen shown in FIG. 12. Since this image processing apparatus is in a state in which the copy function has been selected, the settings for copying (the finishing designations and the output-paper settings) are displayed from among the settings that have been registered on the document.

On the other hand, if the settings for the current function have not been registered ("NO" at step S805), then the default settings for this function are displayed (step S807).

If an OK button is pressed on any screen, control is exercised so as to output the image based upon the displayed settings, and the image is output (step S808). Furthermore, in a case where it is desired to produce an output based upon settings other than those displayed, the OK button is pressed after the settings are changed on the screen shown in FIG. 14. As a result, an output in accordance with the desired settings is produced.

Further, in a case where the code read-in button on the transmit function screen is pressed in a state in which the same document has been placed in the document reader, the settings for image transmission (the transmission destination and the format of the transmitted image, etc.) are made and displayed on the control panel. If the OK button is pressed, control is exercised so as to transmit the image based upon the selected transmit settings, and the image that has been read in is transmitted.

Furthermore, in a case where the code read-in button on the storage function screen is pressed in a state in which the same document has been placed in the document reader, the settings for image storage (the storage destination and the format of the image, etc.) are made and displayed on the control panel. If the OK button is pressed, control is exercised so as to store the image based upon the selected storage settings, and the image that has been read in is stored.

Other Embodiments

In the embodiment described above, settings are registered at the control panel of an image processing apparatus comprising a scanner unit serving as an image input device, a printer unit serving as an image output device, a control unit and a user interface unit. Information representing the registration of the settings is generated as a barcode and the image with the appended barcode is output. If a function for registering settings is implemented in a printer driver, then it is possible to so arrange it that an image with the settings appended thereto is output even in an image processing apparatus comprising a printer unit and a control unit.

Furthermore, in addition to output setup information, an URL, which is information indicating the storage destination of the image data of the original, is registered in a barcode beforehand, and an image processing apparatus that has read the barcode acquires, via a network, the image that has been stored at the storage destination indicated by the URL. It can be so arranged that an image acquired based upon an URL, rather than a read image, is output or transmitted, etc.

Further, an example in which setup information is appended as a barcode is described above. However, the present invention is not limited to this arrangement. Information in other forms may be used as long as the information is capable of being read by an image processing apparatus.

Although an embodiment has been described above in detail, it is possible for the present invention to take on the form of a system, apparatus, method, program or storage medium (recording medium). More specifically, the present invention may be applied to a system constituted by a plurality of devices or to an apparatus comprising a single device.

Furthermore, there are cases where the object of the invention is attained also by supplying a software program (a program corresponding to the flowcharts shown in the drawings of the foregoing embodiment), which implements the functions of the foregoing embodiment, directly or remotely to a system or apparatus, reading the supplied program codes with a computer of the system or apparatus, and then executing the program codes.

Accordingly, since the functional processing of the present invention is implemented by computer, the program codes per se installed in the computer also implement the present invention. In other words, the present invention also covers a computer program per se that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a hard disk, optical disk, magneto-optical disk, CD-ROM, CD-R, CD-RW, magnetic tape, non-volatile memory card, ROM, DVD (DVD-ROM, DVD-R), etc.

As for the method of supplying the program, the program can also be supplied by being downloaded to a recording medium such as a hard disk from a website on the Internet using a browser possessed by a client computer. That is, the website is accessed and the computer program per se of the present invention or an automatically installable compressed file is downloaded from the website. Further, the program of the present invention can be supplied by dividing the program code constituting the program into a plurality of files and downloading the files from different websites. In other words, there are cases where a WWW server that downloads, to multiple users, the program files that implement the functions and processes of the present invention by computer also is covered by the present invention.

Further, the program of the present invention is encrypted, stored on a storage medium such as a CD-ROM and distributed to users. Users who meet certain requirements are allowed to download decryption key information from a website via the Internet. It is possible to run the encrypted program upon decrypting it using the key information, whereby the program is installed in the computer.

Further, the functions of the embodiment are implemented by having a computer execute a program that has been read. In addition, an operating system or the like running on the computer performs all or a part of the actual processing based upon the indications in the program. The functions of the embodiment can be implemented by this processing as well.

Furthermore, after the program read from the recording medium is written to a memory provided on a function expansion board inserted into the computer or provided in a function expansion unit connected to the computer, a CPU or the like mounted on the function expansion board or function expansion unit performs all or a part of the actual processing based upon the indications in the program, whereby the functions of the foregoing embodiment are implemented.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-309003 filed on Oct. 24, 2005, which is hereby incorporated by reference herein in its entirety.

What is claimed is:

1. An image processing apparatus, which has multiple image processing functions, for processing an input image using an image processing function that has been set at the time of image input, comprising:
   a designating unit adapted to designate a processing mode for using any of the plurality of image processing functions to be applied to an image of interest;
   an extracting unit adapted to read a print medium on which the image of interest has been printed, and extract, based upon the reading of the print medium, an identification indicator representing setup information to be used for processing the image of interest;
   an analyzing unit adapted to analyze the identification indicator and acquire the setup information; and
   a processing unit adapted to process the image of interest, after the print medium has been read, using the image processing function associated with the designated processing mode according to particular setup information, among the setup information acquired by said analyzing unit,
   wherein the particular setup information is associated with and indicates settings for the image processing function associated with the designated processing mode,
   wherein the processing unit is adapted to use the particular setup information for executing the image processing function associated with the designated processing mode to process the image of interest, and
   wherein the setup information acquired by said analyzing unit indicates settings dictating how each of the plurality of image processing functions should operate.

2. The apparatus according to claim 1, wherein said processing unit has an image processing function that is capable of executing any processing among processing for copying, processing for transmitting and processing for storing the image of interest.

3. The apparatus according to claim 2, wherein said analyzing unit analyzes setup information relating to processing when processing for copying the image of interest is executed, setup information relating to processing when processing for transmitting the image of interest is executed, and setup information relating to processing when processing for storing the image of interest is executed.

4. The apparatus according to claim 1, wherein in a case where the setup information that has been acquired by analysis by said analyzing unit does not contain setup information relating to an image processing function regarding a processing mode that has been designated by said designating unit when the print medium is read, said processing unit is adapted to process the image of interest based upon default settings of the image processing function regarding the processing mode that has been designated by said designating unit.

5. The apparatus according to claim 1, further comprising a command unit adapted to display the setup information, which has been acquired by said analyzing unit, before processing of the image of interest by said processing unit, and accepting a command from a user to execute the processing;
   wherein said processing unit is adapted to process the image of interest upon receiving the command from said command unit.

6. The apparatus according to claim 1, further comprising a document reading unit adapted to read the document and acquire the image of interest.

7. The apparatus according to claim 1, further comprising:
   a communication unit connected to another apparatus and adapted to communicate with said other apparatus; and
   an image generating unit adapted to generate an image of interest based upon data that has been transmitted from said other apparatus via said communication unit.

8. The apparatus according to claim 1, further comprising:
   a registering unit adapted to register setup information relating to processing for each of the plurality of image processing functions to be applied to the image of interest;
   an encoding unit adapted to encode the setup information and generate the identification indicator; and
   a forming unit adapted to form and output, on the same print medium, the image of interest and the identification indicator that has been encoded by said encoding unit;
   wherein said extracting unit extracts the identification indicator from the print medium on which the indicator has been formed by said forming unit.

9. The apparatus according to claim 8, wherein said encoding unit is adapted to put the identification indicator into the form of a barcode.

10. The apparatus according to claim 1, wherein information relating to a storage destination at which an original image of the image of interest has been stored is included as the setup information, and said apparatus further comprises:
- an acquiring unit adapted to acquire the original image of the image of interest based upon the information relating to the storage destination contained in setup information that has been analyzed by said analyzing unit,
- wherein said processing unit is adapted to process the original image of the image of interest, which has been acquired by said acquiring unit, using setup information to be used by the image processing function regarding the processing mode that has been designated by said designating unit when the print medium is read.

11. An image processing method in an image processing apparatus, which has multiple image processing functions, for processing an input image using an image processing function that has been set at the time of image input, comprising:
- a designating step of designating a processing mode for using any of the plurality of image processing functions to be applied to an image of interest;
- an extracting step of reading a print medium on which the image of interest has been printed, and extracting, based upon the reading of the print medium, an identification indicator, which represents setup information to be used for processing the image of interest;
- an analyzing step of analyzing the identification indicator and acquiring the setup information; and
- a processing step of processing the image of interest, after the print medium has been read, using the image processing function associated with the designated processing mode according to particular setup information, among the setup information acquired in said analyzing step,
- wherein the particular setup information is associated with and indicates settings for the image processing function associated with the designated processing mode,
- wherein the processing step uses the particular setup information for executing the image processing function associated with the designated processing mode to process the image of interest, and
- wherein the setup information acquired in said analyzing step indicates settings dictating how each of the plurality of image processing functions should operate.

12. A non-transitory computer-readable storage medium storing a program, that when executed by a computer in an image processing apparatus, causes the image processing apparatus to execute an image processing method, wherein the image processing apparatus, which has multiple image processing functions, processes an input image using an image processing function that has been set at the time of image input, the method comprising:
- a designating step of designating a processing mode for using any of the plurality of image processing functions to be applied to an image of interest;
- an extracting step of reading a print medium on which the image of interest has been printed, and extracting, based upon the reading of the print medium, an identification indicator, which represents setup information to be used for processing the image of interest;
- an analyzing step of analyzing the identification indicator and acquiring the setup information; and
- a processing step of processing the image of interest, after the print medium has been read, using the image processing function associated with the designated processing mode according to particular setup information, among the setup information acquired in said analyzing step,
- wherein the particular setup information is associated with and indicates settings for the image processing function associated with the designated processing mode,
- wherein the processing step uses the particular setup information for executing the image processing function associated with the designated processing mode to process the image of interest, and
- wherein the setup information acquired in said analyzing step indicates settings dictating how each of the plurality of image processing functions should operate.

* * * * *